United States Patent [19]

Fodor

[11] 4,130,503

[45] Dec. 19, 1978

[54] PHOSPHATE IN MgX$_2$ SUPPORTED TiX$_3$ AlCl$_3$ CATALYST SYSTEM

[75] Inventor: Lawrence M. Fodor, Bartlesville, Okla.

[73] Assignee: Phillips Petroleum Company, Bartlesville, Okla.

[21] Appl. No.: 864,120

[22] Filed: Dec. 23, 1977

[51] Int. Cl.$^2$ .......................... C08F 4/02; C08F 4/16
[52] U.S. Cl. ................................ 252/429 B; 526/125; 526/139
[58] Field of Search .................... 252/429 B, 429C

[56] References Cited

U.S. PATENT DOCUMENTS

| | | | |
|---|---|---|---|
| 3,502,634 | 3/1970 | Stedefeder et al. | 252/429 B |
| 3,558,586 | 1/1971 | Fodor | 252/429 B |
| 3,574,782 | 4/1971 | Bearden, Jr. et al. | 252/429 B |
| 3,576,902 | 4/1971 | Bearden, Jr. et al. | 252/429 B |
| 3,888,835 | 6/1975 | Ito et al. | 252/429 B |
| 3,926,928 | 12/1975 | Karayannis et al. | 252/429 B |
| 3,940,345 | 2/1976 | Count | 252/429 B |
| 3,953,414 | 4/1976 | Galli et al. | 252/429 C |
| 4,021,599 | 5/1977 | Kochar et al. | 252/429 B |

FOREIGN PATENT DOCUMENTS

| | | |
|---|---|---|
| 2347577 | 5/1974 | Fed. Rep. of Germany. |
| 885869 | 6/1960 | United Kingdom. |
| 1387890 | 3/1975 | United Kingdom. |

*Primary Examiner*—P. E. Konopka

[57] ABSTRACT

A catalyst system is made up of a catalyst and a cocatalyst. The catalyst component comprises a magnesium chloride support, a titanium trichloride, an aluminum trichloride and an organic phosphite. The cocatalyst comprises an organoaluminum compound. Exemplary of such a system is a MgCl$_2$ supported TiCl$_3$ . 1/3AlCl$_3$ plus triphenyl phosphite as the catalyst and triethylaluminum plus diethylaluminum chloride and ethyl anisate as the cocatalyst. Such catalyst systems give both high productivity and low solubles in the polymerization of propylene. For ethylene polymerization, the cocatalyst can simply be triethylaluminum.

12 Claims, No Drawings

PHOSPHITE IN MGX$_2$ SUPPORTED TIX$_3$/ALCL$_3$ CATALYST SYSTEM

BACKGROUND OF THE INVENTION

This invention relates to supported titanium trichloride catalyst systems. It is broadly known to utilize TiCl$_3$ or even TiCl$_4$ as a propylene polymerization catalyst. However, such catalysts tend to produce a high proportion of material which is soluble in solvents such as normal hexane. It has been found that the solubles formation can be suppressed by the use of various adjuvants as disclosed, for instance, in German Pat. No. 2,347,577. Unfortunately, suppression of solubles formation also generally suppresses the overall production of polymer.

SUMMARY OF THE INVENTION

It is an object of this invention to polymerize propylene at high productivity rates without the formation of substantial amounts of soluble materials; it is the further object of this invention to provide an improved catalyst for polymerization of olefins such as propylene; and it is yet a further object of this invention to provide an improved process for producing supported titanium trichloride catalyst systems.

In accordance with this invention, the phosphite is combined with a magnesium halide supported TiCl$_3$/AlCl$_3$ catalyst system and the resulting catalyst activated with an organoaluminum component.

DESCRIPTION OF THE PREFERRED EMBODIMENTS

The catalyst system of this invention employs a magnesium chloride support for the titanium component. This magnesium chloride support is preferably anhydrous. The presence of the support is essential to the invention.

The titanium component is titanium trichloride. This component must further contain some aluminum chloride. This is preferably accomplished simply by reducing titanium tetrachloride with sufficient aluminum to give TiCl$_3$.1/3AlCl$_3$ which is known as TiCl$_3$AA. However, the titanium trichloride component can be produced by reduction of TiCl$_4$ with hydrogen or magnesium as is known in the art with the aluminum chloride being added as a separate ingredient. Also, titanium trichlorides can be produced by reducing titanium tetrachloride with a milled magnesium/aluminum chloride mixture to give a TiCl$_3$ mixture already containing the aluminum chloride. Finally, the TiCl$_4$ can be reduced with a product obtained by mixing magnesium metal and an alkyl halide in the absence of a complexing diluent such as ether; in this instance, the magnesium halide support would already be formed since this is one of the reaction products of the magnesium metal and the organic halide or additional magnesium halide may be added. The aluminum chloride, in this instance, would be added as a separate component.

The organic phosphite adjuvant required in the catalyst component of this invention to reduce soluble polymer formation during polymerization is preferably an aryl phosphite. Most preferred is triphenyl phosphite (TPP). Other suitable phosphites are tri-1-naphthyl phosphite, tri-9-anthryl phosphite, tri-4-phenanthryl phosphite, tri-o-tolyl phosphite, tri-p-cumenyl phosphite, tris(4-pentyl-1-naphthyl) phosphite, tris(3-heptyl-1-anthryl) phosphite, tris(5-decyl-2-phenanthryl) phosphite, tris(3-cyclobutylphenyl) phosphite, tris(6-cycloheptyl-2-naphthyl) phosphite, tris(10-cyclodecyl-9-anthryl) phosphite, tris(3-cyclopentylphenyl) phosphite, tris(4-12-naphthyl)phenyl phosphite, tris(7-phenyl-1-naphthyl) phosphite, tris(6-phenyl-2-anthryl) phosphite, tris(7-phenyl-1-phenanthryl) phosphite, and the like.

The weight ratio of catalyst components is: 50 to 95, preferably 70 to 90 weight percent MgCl$_2$, 2 to 20, preferably 4 to 12 weight percent TiCl$_3$, 0.1 to 10, preferably 1 to 4 weight percent AlCl$_3$, and 1 to 20, preferably 5 to 15 weight percent phosphite, each percentage being based on the total weight of the catalyst. One particularly satisfactory composition consists of 80 weight percent MgCl$_2$, 11.2 weight percent TiCl$_3$AA, and 8.8 weight percent TPP. The catalyst components are combined under intensive mixing conditions. Any conventional milling technique known in the art can be utilized for this intensive milling. Suitable techniques include ball milling, rod milling, pebble milling, and vibratory ball milling. The term milling as used herein is also meant to encompass high speed shear stirring, colloid milling or passage through an orifice of a homogenizing valve at high pressure, for instance, 1,000 psig or greater. All of these produce intensive milling conditions wherein heat is generated and agglomerates are broken up. The milling times will generally be in the range of 0.1 to 20, preferably 1 to 10, more preferably 2 to 5 hours, for conventional milling techniques. The use of vibratory ball milling reduces the required times by a factor of about 10.

The milling process is generally carried out in a dry, inert atmosphere at ambient temperatures with cooling not normally required. If desired, the milling can take place in the presence of a dry hydrocarbon diluent such as hexane, heptane, cyclohexane, and the like, which is inert and nonreactive with respect to the subsequent polymerization reaction. Alternatively, no other diluent at all can be used. Temperatures during milling will generally be 40°-110° C., preferably 50°-70° C. The resulting mixture can be conveniently stored in a dry vessel in an inert atmosphere until it or a portion thereof is needed for use in a polymerization process.

A three component cocatalyst is essential to activate the catalyst properly for propylene polymerization. This consists of a trialkyl aluminum, a dihydrocarbylaluminum halide, and a para-substituted benzoic acid alkyl ester. The trialkyl aluminum compound has the formula AlR$_3$ wherein each R is the same or a different alkyl group containing 1–12 carbon atoms. Examples of suitable trialkyl aluminum compounds include trimethylaluminum, triethylaluminum, tri-n-dodecylaluminum, dimethylethylaluminum, and mixtures thereof. Triethylaluminum (TEA) is presently preferred. The dihydrocarbylaluminum halide compound has the formula of R'$_2$AlX in which X is a halogen atom, preferably chlorine or bromine and each R' is the same or a different radical selected from alkyl and aryl radicals, having from 1 to 12 carbon atoms. Exemplary compounds include dimethylaluminum, bromide, diethylaluminum chloride, diphenylaluminum chloride, ethylphenylaluminum chloride, di-n-dodecylaluminum bromide, and the like. A presently preferred compound is diethylaluminum chloride (DEAC). The para-substituted benzoic acid alkyl ester is preferably substituted with a 1–2 carbon atom alkoxy group. The alkyl group of the ester is a 1–12 carbon atom radical. The preferred material is ethyl anisate, i.e. the compound where the alkoxy group is methoxy and the alkyl radical of the ester is ethyl.

Mole ratios of trialkyl aluminum:dihydrocarbylaluminum halide:ester can range from about 2-7:- 2-5:1, preferably from about 2-4:2-4:1.

For ethylene polymerization, the cocatalyst can simply be the trialkyl aluminum.

The mole ratio of organoaluminum compounds to the TiCl₃/AlCl₃ component can range from about 40:1 to about 500:1, more preferably from about 50:1 to 400:1.

The amount of catalyst used in the polymerization process can vary widely. However, concentrations of total catalyst including catalyst and cocatalyst ranging from about 0.002 to about 0.2 weight percent based on the weight of catalyst plus monomer give good results.

Conventional batch or continuous polymerization processes can be utilized with the catalysts of this invention. For example, polymerization can be accomplished in the presence of a diluent inert in the process, e.g. a paraffinic hydrocarbon, or in the absence of a diluent when polymerization is effected in the presence of liquid monomer which is presently preferred when propylene is polymerized. Molecular weight control of the polymeric product is accomplished by the use of hydrogen as is well known to those skilled in the art.

The pressure of the monomer in the process can vary from about atmospheric or higher. Pressures ranging from 50 to about 600 psig (344-4130 kPa) or higher are conveniently employed.

The reactor temperature can vary rom about 0° to 200° C. For propylene polymerization, temperatures of from about 60° to 100° C., preferably from about 70° to 90° C. are used.

The catalyst system of this invention can be utilized for the polymerization of at least one mono-1-olefin having 2 to 8 carbon atoms per molecule. It is of particular applicability to the polymerization of propylene at high rates with low solubles utilizing as the cocatalyst the trialkyl aluminum plus the dihydrocarbylaluminum halide and ester. It is also useful for polymerization of ethylene preferably using the trialkyl aluminum as the cocatalyst. It is also useful for polymerization of ethylene with minor amounts of higher 1-olefins such as propylene, butene, or 1-hexene again utilizing preferably the trialkyl aluminum as this cocatalyst.

EXAMPLE 1

In this example, as well as in all the others, propylene polymerization was conducted in a 1 liter, stirred, stainless steel reactor. The reactor was filled with hexane, adding 5 ml of 25 percent diethylaluminum chloride (DEAC), and heating to about 275° F. (135° C.) for 1 hour. The contents were discharged and the reactor flushed with dry nitrogen. The catalyst and cocatalyst were charged through an entry port while maintaining a nitrogen purge. The port was sealed and ¼ liter of hydrogen (STP) was added. The reactor was then filled approximately ⅔ full with liquid propylene and reactor and contents heated to the reaction temperature to be employed. At that time, the reactor was filled liquid full with propylene and maintained in that condition by means of a propylene reservoir open to the reactor and pressured to 500 psig (3450 kPa) with dry nitrogen. Upon completion of the run, the propylene was vented, the polymer was recovered, washed with methanol, stabilized with a conventional antioxidant system and dried in a vaccum oven. Productivity was determined from the weight of recovered polymer. Xylene soluble and propylene soluble measurements were conventionally determined from the recovered polymer.

Each catalyst was prepared by milling 25 g portions of the described composition in a 200 cc milling vessel containing 200 g of ⅜ inch (0.95 cm) steel balls for about 24 hours at ambient temperature on a vibratory mill.

The composition of the catalysts and cocatalysts used, weights of catalyst and cocatalyst charged, and results obtained are given in Table I. Each run was conducted for 1 hour at the temperature indicated.

Table I

Catalysts Prepared From TiCl₃AA, Magnesium Chloride and Ethyl Benzoate

| Run No. | Catalyst | | | Catalyst Charged | | | Cocatalyst | | Aluminum Charged[1] (m.moles) |
|---|---|---|---|---|---|---|---|---|---|
| | TiCl₃AA (wt. %) | MgCl₂ (wt. %) | EB (Wt. %) | Total (mg) | TiCl₃AA (mg) | TiCl₃AA (m.moles) | Type | Mole Ratio | |
| 1 | 100 | — | — | 114.8 | 114.8 | 0.58 | TEA/EA | 3.5/1 | 4.03 |
| 2 | 10 | 90 | — | 75.8 | 7.58 | 0.031 | TEA/EA | 3.5/1 | 8.05 |
| 3 | 17.2 | 80 | 2.8 | 59.7 | 10.3 | 0.0518 | TEA/EA | 3.5/1 | 6.70 |
| 4 | 14.0 | 80 | 6.0 | 60.3 | 8.44 | 0.0424 | TEA/EA | 3.5/1 | 6.70 |
| 5 | 11.2 | 80 | 8.8 | 83.5 | 9.32 | 0.0469 | TEA/EA | 3.5/1 | 9.31 |
| 6 | 11.2 | 80 | 8.8 | 36.2 | 4.05 | 0.0203 | TEA/EA | 3/1 | 4.12 |
| 7 | 11.2 | 80 | 8.8 | 36.4 | 4.08 | 0.0205 | TEA/EA | 3/1 | 4.12 |
| 8 | 11.2 | 80 | 8.8 | 48.7 | 5.45 | 0.0274 | TEA/EA | 2/1 | 5.78 |
| 9 | 11.2 | 80 | 8.8 | 69.7 | 7.81 | 0.0393 | TEA/EA | 2.5/1 | 7.92 |
| 10 | 11.2 | 80 | 8.8 | 39.5 | 4.42 | 0.0247 | TEA/EA | 3/1 | 4.43 |

| Run No. | Mole Ratio Al/Ti | Reactor Temp. °C | Productivity (g/g catalyst) | Xylene Solubles (Wt. %) | Remarks |
|---|---|---|---|---|---|
| 1 | 6.9 | 60 | 712 | 22.2 | base control |
| 2 | 211 | 60 | 1404 | 20.0 | comparison control |
| 3 | 129 | 60 | 1414 | 19.9 | comparison control |
| 4 | 158 | 60 | 1677 | 15.8 | comparison control |
| 5 | 198 | 60 | 2343 | 11.8 | comparison control |
| 6 | 201 | 79 | 1575 | 9.6 | comparison control |
| 7 | 201 | 71 | 2082 | 10.1 | comparison control |
| 8 | 211 | 60 | 1127 | 9.2 | comparison control |
| 9 | 202 | 60 | 1643 | 13.4 | comparison control |
| 10 | 179 | 60 | 2116 | 11.3 | comparison control |

[1]As organoaluminum compound

The results in control run 1 show that a standard TiCl₃AA commercially available (Stauffer grade 1.1) in conjunction with a cocatalyst of TEA/EA having a 3.5/1 mole ratio was fairly active for propylene polymerization at 140° F. However, soluble polymer formation of 22.2 weight percent is undesirably high. Runs 2-10 are also control runs which are presented to show the effect of adjusting other variables.

The beneficial effect of supporting the TiCl₃AA on MgCl₂ is seen in run 2 wherein productivity was approximately doubled (712 versus 1404 g polymer/g catalyst) while a small reduction in soluble polymer formation also occurred.

Runs 3-5 are concerned with MgCl₂-supported TiCl₃AA catalysts also containing EB. At a constant TEA/EA mole ratio of 3.5/1 and reactor temperature of 140° F., the catalyst productivity increases and soluble polymer formation decreases as the catalyst composition is changed. Run 3 gave relatively poor results because the concentration of adjuvant was below the preferred level of 5 percent and also because the carboxylic acid ester is less effective than the phosphite in the catalyst component itself. Relatively good productivity was obtained with a catalyst consisting of 11.2 weight percent TiCl₃AA, 80 weight percent MgCl₂ and 8.8 weight percent EB as shown in control run 5 but solubles was high. Control runs 6-10 demonstrate that reactor temperatures varying from 140°-175° F. and TEA/EA mole ratios varying from 2/1 to 3.5/1 are operable with the run 5 catalyst.

EXAMPLE 2

In this example, the effect of adding a third component to the cocatalyst system used in conjunction with the catalyst used in runs 5-10 of Example 1 was determined. One hour runs at 140° F. in liquid propylene were made as described before. The results obtained are presented in Table II. These are all control runs since there is no phosphite in the catalyst component.

effective in increasing activity from the base control activity of 1647 g polymer/g catalyst to 2286 g polymer/g catalyst in run 13. Soluble polymer formation remained about the same in runs 11 and 13. A mole ratio of 3 TEA/3 DEAC/1 EA appeared to be about optimum although no serious effects were observed at slightly higher or lower values.

Runs 16-18 show the effect of adding triphenyl phosphite (TPP) to the TEA/EA cocatalyst. It is seen that at the lowest level of TPP, run 16, solubles increased while productivity decreased slightly. At the highest level of TPP, run 18, solubles and productivity decreased significantly.

None of Example 2 catalyst systems are invention catalysts because of high solubles or low productivity caused by not having a phosphite in the catalyst component. This shows that even with DEAC in the cocatalyst, both good productivity and low solubles are not obtained. The presence of the phosphite in the cocatalyst is shown to be ineffective although as will be shown in Example 3, phosphite in the catalyst component is effective in systems also containing DEAC in the cocatalyst.

EXAMPLE 3

A series of supported catalysts was made by milling approximately 25 g portions of each catalyst for about 24 hours on a vibratory mill as described in Example 1. Each catalyst contained TPP in place of the EB used in the first two examples. Each run was conducted for 1 hour in liquid propylene as described earlier. The cata- Table II

| | Cocatalyst Variations With Catalysts Containing TiCl₃AA, MgCl₂ and Ethyl Benzoate | | | | | | | | |
|---|---|---|---|---|---|---|---|---|---|
| | Catalyst Charged | | | Cocatalyst | | | | | |
| Run No. | Total (mg) | TiCl₃AA (mg) | TiCl₃AA (m.moles) | Type | Mole Ratio | Aluminum Charged[1] (m.moles) | Mole Ratio Al/Ti | Productivity (g/g catalyst) | Xylene Solubles (Wt. %) | Remarks |
| 11 | 16.7 | 1.87 | 0.0094 | TEA/EA | 3/1 | 1.96 | 209 | 1647 | 16.1 | base control |
| 12 | 25.0 | 2.80 | 0.0140 | TEA/DEAC/EA | 3/1.5/1 | 3.90 | 279 | 22.9 | comparison | |
| 13 | 36.7 | 4.11 | 0.0207 | TEA/DEAC/EA | 3/3/1 | 6.78 | 328 | 2286 | 18.7 | control comparison |
| 14 | 47.4 | 5.31 | 0.0267 | TEA/DEAC/EA | 3/3.75/1 | 9.34 | 350 | 2192 | 15.6 | control comparison |
| 15 | 32.0 | 3.58 | 0.0180 | TEA/DEAC/EA | 3/4.5/1 | 9.60 | 533 | 2038 | 18.8 | control comparison |
| 16 | 34.2 | 3.83 | 0.0193 | TEA/TPP/EA | 3/0.135/1 | 3.17 | 164 | 1558 | 21.8 | control comparison control |
| 17 | 34.5 | 3.86 | 0.0194 | TEA/TPP/EA | 3/0.27/1 | 3.20 | 165 | 1377 | 14.9 | comparison control |
| 18 | 37.8 | 4.23 | 0.0213 | TEA/TPP/EA | 3/0.54/1 | 3.47 | 163 | 915 | 12.1 | comparison control |

[1]As organoaluminum compound(s)

Run 11 is the base control run for the series of comparison given in Table II. The addition of DEAC was lyst compositions employed, conditions used and results obtained are presented in Table III.

Table III

| | Catalysts Prepared From TiCl₃AA, MgCl₂ and Triphenyl Phosphite | | | | | | | | |
|---|---|---|---|---|---|---|---|---|---|
| | Catalyst | | | Catalyst Charged | | | Cocatalyst | | |
| Run No. | TiCl₃AA (wt. %) | MgCl₂ (wt. %) | TPP (wt. %) | Total (mg) | TiCl₃AA (mg) | TiCl₃AA (m.moles) | Type | Mole Ratio | Aluminum Charged[1] (m.moles) |
| 19 | 10 | 72 | 18 | 49.3 | 4.93 | 0.0248 | TEA/EA | 3/1 | 4.53 |
| 20 | 10 | 72 | 18 | 33.5 | 3.35 | 0.0169 | TEA/EA | 3/1 | 3.09 |
| 21 | 11.2 | 80 | 8.8 | 46.7 | 5.23 | 0.0263 | TEA/EA | 3/1 | 3.92 |
| 22 | 11.2 | 80 | 8.8 | 26.7 | 2.99 | 0.0150 | TEA/EA | 3/1 | 2.34 |
| 23 | 11.2 | 80 | 8.8 | 25.1 | 2.81 | 0.0141 | TEA/DEAC | 1/1 | 5.34 |
| 24 | 11.2 | 80 | 8.8 | 32.4 | 3.63 | 0.0182 | TEA/DEAC/EA | 2/2/1 | 4.60 |

Table III-continued

Catalysts Prepared From TiCl₃AA, MgCl₂ and Triphenyl Phosphite

| Run | | | | | | | Cocatalyst | Ratio | |
|---|---|---|---|---|---|---|---|---|---|
| 25 | 11.2 | 80 | 8.8 | 17.9 | 2.00 | 0.0101 | TEA/DEAC/EA | 2/2/1 | 3.14 |
| 26 | 11.2 | 80 | 8.8 | 29.4 | 3.29 | 0.0165 | TEA/DEAC/EA | 2.5/2.5/1 | 5.34 |
| 27 | 11.2 | 80 | 8.8 | 37.4 | 4.19 | 0.0211 | TEA/DEAC/EA | 3/3/1 | 8.44 |
| 28 | 11.2 | 80 | 8.8 | 26.0 | 2.91 | 0.0146 | TEA/DEAC/EA | 3/2.4/1 | 1.30 |
| 29 | 11.2 | 80 | 8.8 | 40.7 | 4.56 | 0.0229 | TEA/DEAC/EA | 3/3/1 | 2.94 |
| 30 | 11.2 | 80 | 8.8 | 20.1 | 2.25 | 0.0113 | TEA/DEAC/EA | 3/3/1 | 1.48 |
| 31 | 11.2 | 80 | 8.8 | 19.0 | 2.13 | 0.0107 | TEA/DEAC/EA | 3/3/1 | 0.94 |
| 32 | 11.2 | 80 | 8.8 | 19.9 | 2.23 | 0.0112 | TEA/DEAC/EA | 3/3.75/1 | 0.94 |
| 33 | 11.2 | 80 | 8.8 | 50.7 | 5.68 | 0.0285 | TEA/EB | 3/1 | 4.50 |
| 34 | 11.2 | 80 | 8.8 | 57.6 | 6.45 | 0.0324 | TEA/DEAC/EB | 2/2/1 | 3.66 |
| 35 | 11.2 | 80 | 8.8 | 46.1 | 5.16 | 0.0259 | TEA/DEAC/EB | 3/3/1 | 3.30 |
| 36 | 11.2 | 80 | 8.8 | 35.0 | 3.92 | 0.0197 | TEA/DEAC/EB | 3.5/3.5/1 | 2.58 |
| 37 | 11.2 | 80 | 8.8 | 31.8 | 3.56 | 0.0179 | TEA/DEAC/EB | 3.5/3.5/1 | 2.38 |

(1) As organoaluminum compound(s)

| Run No. | Mole Ratio Al/Ti | Reactor Temp. °C | Productivity (g/g catalyst) | Xylene Solubles (wt. %) | Remarks |
|---|---|---|---|---|---|
| 19 | 184 | 60 | 1998 | 16.9 | control |
| 20 | 183 | 79 | 1272 | 10.0 | control |
| 21 | 149 | 60 | 1816 | 13.6 | control |
| 22 | 156 | 79 | 1097 | 6.8 | control |
| 23 | 379 | 79 | 5578 | 37.9 | control |
| 24 | 253 | 79 | 2191 | 5.4 | invention |
| 25 | 311 | 85 | 2318 | 6.0 | invention |
| 26 | 324 | 79 | 2337 | 6.6 | invention |
| 27 | 400 | 79 | 2545 | 8.5 | invention |
| 28 | 89 | 85 | 3877 | 7.2 | invention |
| 29 | 128 | 85 | 3324 | 7.5 | invention |
| 30 | 131 | 85 | 3438 | 8.6 | invention |
| 31 | 88 | 85 | 3600 | 11.9 | invention |
| 32 | 84 | 85 | 3367 | 10.5 | invention |
| 33 | 158 | 79 | 107 | 14.2 | control |
| 34 | 113 | 79 | 950 | 7.5 | control |
| 35 | 127 | 79 | 1134 | 9.3 | control |
| 36 | 131 | 79 | 2411 | 12.6 | control |
| 37 | 133 | 60 | 1142 | 20.6 | control |

Inspection of the results given in Table III shows in control run 19, wherein a TEA/EA mole ratio of 3/1 is used, that solubles are high when polymerization is conducted at 60° C. Control run 20 shows an advantage for conducting the polymerization at 79° C. in view of lower solubles although neither productivity nor soluble values are particularly good. The remaining runs were made using catalyst with TPP content lowered to 8.8 weight percent which appears to be about optimum. A comparison of control runs 22 and 23 with invention run 24 shows that with a phosphite in the catalyst system, both DEAC (to give good productivity) and the para-substituted benzoic acid alkyl ester (to give low solubles) in required.

Invention runs 24-32 are concerned with exploring the effect of the addition of DEAC to the TEA/EA cocatalyst with polymerization temperatures of either 79° C. or 85° C. At 79° C., invention runs 24, 26 and 27 shows that productivities ranging from about 2191-2545 g polymer/g catalyst and solubles ranging from 5.4-8.5 weight percent are realized with cocatalysts having 2-3 TEA/2-3 DEAC/1 EA mole ratios. At 85° C., invention runs 25, 28-32 demonstrate that productivities ranging from 3324-3877 g polymer/g catalyst and solubles ranging from 6 to about 12 weight percent are realized with cocatalysts having 3 TEA/2-.3-3.75 DEAC/1 EA mole ratios. Unexpectedly high polymer production with low soluble polymer formation are thus possible with the invention catalyst systems.

Control runs 33-37 shows that an unsubstituted benzoic acid ester such as ethyl benzoate (EB) above cannot be used as the electron donor in the cocatalyst because of low productivity. Control 33, like control 22 further shows the requirement for the dihydrocarbylaluminum halide (DEAC) compound.

EXAMPLE 4

The utility of TiCl₃ produced by methods other than aluminum reduction in the supported catalysts of this invention was explored. All catalysts were prepared by milling about 25 g of the catalyst composition as described in previous examples. However, the catalyst of control run 49 was milled on a rotary ball mill.

The TiCl₃AA used in the catalyst composition of run 38 is a commercial catalyst designated by Stauffer as grade 2.1.

The TiCl₃HA used in the catalyst compositions of runs 39 and 40 was obtained commercially and produced by hydrogen reduction of TiCl₄.

The Mg·AlCl₃ reduced TiCl₃ catalyst component used in runs 41-44 was prepared from an intimate mixture of Mg powder and anhydrous AlCl₃. The mixture was made by charging a 1 liter steel vessel under a nitrogen purge with 30 g powdered aluminum (1.23 moles), 55 g anhydrous AlCl₃ (0.41 moles) and 2000 g of ⅜ inch steel balls. The mixture was milled for 6 hours at ambient temperature on a vibratory mill after which the Mg.AlCl$_3$ mixture, mole ratio = 3/1, was separated and stored for later use. Ten g of the mixture (0.154 moles Mg) and 172.6 g TiCl$_4$ (0.91 moles) was charged under a N$_2$ purge to a 500 ml flask. The mixture was refluxed for 22.5 hours. The resulting mixture was reslurried 3 times with dry n-hexane and decanting supernatant liquid. The purple solid was dried under vacuum in a dry box at ambient temperature.

The Mg.AlCl$_3$ (TEA washed) reduced TiCl$_3$ catalyst component used in runs 45-48 was prepared from the Mg.AlCl$_3$ mixture by the following procedure: Ten g of the mixture (0.154 moles Mg) and 100 ml TEA (0.1 moles) was charged under a N$_2$ purge to a 500 ml flask, stirred 1 hour at ambient temperaure and diluted to 500 ml with dry n-hexane. Supernatant liquid was decanted and the product reslurried in dry n-hexane as before. Supernatent liquid was decanted, the product reslurried with about 250 ml of dry soltrol ® 130 (mixture of isoparaffinic hydrocarbons, initial BP = 349° F. (176° C.) and end point at 406° F. (208° C.). The supernatant liquid was decanted and the product still in the flask dried under a N$_2$ purge at ambient temperature in a dry box. To the mixture was charged 69.0 g (0.364 moles) of TiCl$_4$. While stirring, the mixture was heated to reflux in about 6¾ hours. Refluxing was continued for about 4¼ hours and then cooled to ambient temperature. The mixture was diluted to about 500 ml with dry n-hexane while stirring. The stirring was stopped and the supernatant liquid decanted. After reslurrying twice more with stirring and decanting supernatant liquid, the purple solid was dried in a dry box at ambient temperature under a vacuum. These are control runs because the TEA wash removes at least a major amount of the AlCl$_3$ which is essential to the cocatalyst for propylene polymerization.

The TiCl$_3$ catalyst component of runs 49 and 50 was prepared by reducing TiCl$_4$ in a ball mill with a mixture of magnesium powder, TiCl$_4$, and n-pentyl chloride. The organic halide instead of n-pentyl chloride can be a saturated or unsaturated hydrocarbyl halide having the formula R″X in which X represents a halogen, preferably chlorine or bromine, and R″ is selected from alkynyl, alkenyl, alkyl, aryl, cycloalkenyl or cycloalkyl radicals and combinations thereof containing 1 to 12 carbon atoms per molecule. Exemplary compounds include cyclohexyl chloride and bromobenzene. The organic halide can also be a polyhalogenated hydrocarbyl halide of the formula R‴X$_2$ where X is a halogen atom as before and R‴ is a saturated divalent aliphatic hydrocarbyl radical containing from 2 to 10 carbon atoms per molecule. Exemplary compounds include 1,2-dibromomethane, 1,4-dichlorobutane, 1,10-bromodecane, and the like. An alkyl halide is presently preferred, however, containing from 1 to 12 carbon atoms. Representative alkyl halides include methyl chloride, n-butyl chloride, n-pentyl chloride, n-dodecyl chloride, and the like. A primary alkyl halide such as n-pentyl chloride is most preferred.

The magnesium is in the form of the free metal, preferably in the form of powder.

The magnesium metal and organic halide are preferably reacted in stoichiometric amounts, although this can vary from 0.25:1 to 1:0.25 g atoms Mg:moles of organic halide. A typical analysis of the magnesium reducing agent using n-pentyl chloride added dropwise to magnesium in the absence of any diluent is:

| Hydrocarbon Soluble Components | |
|---|---|
| Chemical Compound | Weight Percent |
| Di-n-pentylmagnesium | 25.0 |
| Decane | 8.2 |
| Di-n-decylmagnesium | 1.1 |
| Magnesium n-pentoxide | 0.6 |
| Hydrocarbon Insoluble Components | |
| Magnesium chloride | 55.2 |
| Magnesium | 4.9 |
| Chloromagnesium hydride | 2.3 |
| n-Pentylmagnesium chloride | 2.0 |
| Magnesium n-pentoxide | 0.7 |

This is shown for illustrative purposes and substantial variation in the exact analysis from that shown can be obtained if a different halogen is used or if a different organo radical is substituted for the n-pentyl. However, in all cases, there is present a substantial amount (at least 10 weight percent) each of the diorganomagnesium and the magnesium chloride.

The milling can be carried out using the techniques described hereinabove for milling of the catalyst components.

Polymerization was performed as before in 1 hour runs in liquid propylene at 79° C.

Compositions of the various catalysts and cocatalysts employed and results obtained are given in Table IV.

Table IV

| | | Catalysts Comprising TiCl$_3$ and MgCl$_2$ | | | | | |
|---|---|---|---|---|---|---|---|
| | | | Catalyst Charged | | | Cocatalyst | |
| Run No. | Catalyst Composition (Wt. %) | Total (mg) | TiCl$_3$ Compounds (mg) | (m.moles) | Type | Mole Ratio | Aluminum Charged[1] (m.moles) |
| 38 | 80 MgCl$_2$/11 TiCl$_3$AA/9 TPP | 26.9 | 2.96 | 0.0149 | TEA/DEAC/EA | 2/2/1 | 1.72 |
| 39 | MgCl$_2$/11 TiCl$_3$HA/9 TPP | 25.7 | 2.83[2] | 0.0183 | TEA/DEAC/EA | 2/2/1 | 1.22 |
| 40 | 76 MgCl$_2$/11 TiCl$_3$HA/4 AlCl$_3$/9 TPP | 28.4 | 3.12[2] | 0.0202 | TEA/DEAC/EA | 2/2/1 | 1.34 |
| 41 | Mg . 3 reduced TiCl$_3$ | 42.7 | 38.7[3] | 0.1917 | TEA/DEAC/EA | 2/2/1 | 2.02 |
| 42 | 80 MgCl$_2$/11 Mg . AlCl$_3$ reduced TiCl$_3$/9 TPP | 21.9 | 2.18[3] | 0.0108 | TEA/DEAC/EA | 2/2/1 | 1.03 |
| 43 | 80 MgCl$_2$/11 Mg . AlCl$_3$ reduced TiCl$_3$/9 TPP | 27.4 | 2.73[3] | 0.0135 | TEA/DEAC/EA | 2.5/2.5/1 | 1.29 |
| 44 | 80 MgCl$_2$/11 Mg . AlCl$_3$ reduced TiCl$_3$/9 TPP | 33.4 | 3.33[3] | 0.0165 | TEA/DEAC/EA | 3/3/1 | 1.71 |
| 45 | 90 Mg . AlCl$_3$ (TEA washed) reduced TiCl$_3$ 10 TPP | 31.4 | 28.3 | 0.183 | TEA/DEAC/EA | 2/2/1 | 1.98 |
| 46 | 80 MgCl$_2$ 11 Mg . AlCl$_3$ (TEA washed) reduced TiCl$_3$ 9 TPP | 29.4 | 3.23 | 0.0160 | TEA/DEAC/EA | 2/2/1 | 1.84 |

Table IV-continued

| | | Catalysts Comprising TiCl₃ and MgCl₂ | | | | | |
|---|---|---|---|---|---|---|---|
| 47 | Same as run 46 | 24.9 | 2.74 | 0.0119 | TEA/DEAC-/EA | 2.5/2.5/1 | 1.18 |
| 48 | Same as run 46 | 36.4 | 4.00 | 0.0198 | TEA/DEAC-/EA | 6.7/3/1 | 3.03 |
| 49 | 46 MgCl₂/44.8 TiCl₃/9.2 Mg | 17.8 | 7.97$^{(2)}$ | 0.0517 | TEA/DEAC-/EA | 2/2/1 | 0.848 |
| 50 | 77.2 MgCl₂/12.7 TiCl₃/1.1 Mg/9 TPP | 31.9 | 4.00$^{(2)}$ | 0.0263 | TEA/DEAC-/EA | 2/2/1 | 1.51 |

$^{(1)}$As organoaluminum compounds
$^{(2)}$Based on TiCl₃
$^{(3)}$Based on TiCl₃ . 1/2 MgCl₂

| Run No. | Mole Ratio Al/Ti | Productivity (g/g catalyst) | Total Xylene Soluble (Wt. %) | Remarks |
|---|---|---|---|---|
| 38 | 115 | 1970 | 7.8 | invention |
| 39 | 67 | 2117 | 13.7 | control |
| 40 | 66 | 2197 | 7.2 | invention |
| 41 | 11 | 550 | 17.8 | control |
| 42 | 95 | 1192 | 5.8 | invention |
| 43 | 96 | 2350 | 9.1 | invention |
| 44 | 104 | 2722 | 9.4 | invention |
| 45 | 95 | 1382 | 15.6 | control |
| 46 | 115 | 956 | 6.0 | control |
| 47 | 99 | 1133 | 8.3 | control |
| 48 | 153 | 2544 | 9.6 | control |
| 49 | 16 | 2500 | 15.6 | control |
| 50 | 57 | 2000 | 9.1 | control |

Invention run 38 employed a catalyst containing a TiCl₃AA (Stauffer 2.1 grade) stated to be more active than the 1.1 grade used in the previous examples. No advantage is apparent with the higher activity TiCl₃AA in the invention runs, however. Hydrogen reduced TiCl₃ was tested in the standard catalyst recipe in control run 39 and was found to yield activity about equal to TiCl₃AA. However, solubles produced were not good, thus showing the need for the presence of AlCl₃ in the catalyst. When AlCl₃ was added to the catalyst, run 40, the solubles decreased to 7.2 weight percent at about the same activity obtained in run 39. No advantage is observed over a catalyst already containing AlCl₃ such as TiCl₃AA, however.

Another type of TiCl₃ used was a Mg.Al₃ reduced TiCl₃. As shown in control run 41, this composition exhibited low activity along with high solubles formation when used with a TEA/DEAC/EA cocatalyst because of the absence of a phosphite in the catalyst component. When the material was used in the standard recipe to prepare a supported catalyst, invention run 42, the activity increased to 1192 g polymer/g catalyst with 5.8 weight percent solubles when the molar ratio of TEA/DEAC/EA was 2/2/1. At higher ratios, invention runs 43 and 44, both activity and solubles increased, reaching 2722 g polymer/g catalyst and 9.4 weight percent solubles at a TEA/DEAC/EA mole ratio of 3/3/1 (invention run 44).

Another TiCl₃ was prepared by magnesium reduction of TiCl₃ after the Mg.AlCl₃ had been washed with TEA to remove essentially all of the AlCl₃ and leave only the activated Mg surface. This catalyst, even after milling in the presence of TPP, still produced 15.6 weight percent solubles due to the absence of AlCl₃ in the catalyst component although productivity was 1382 g polymer/g catalyst as shown in control run 45. Supporting the catalyst on MgCl₂, with TPP, lowered solubles to the 6-10 weight percent range, control runs 46-48, depending upon the cocatalyst composition but none produced a good balance of high productivity and low solubles.

Control run 49, illustrates another type of TiCl₃, prepared by ball milling a mixture of Mg, TiCl₄ and n-pentyl chloride to obtain a product whose composition is shown in Table IV. Note there is no appreciable amount of organomagnesium because this is used up in reaction with the TiCl₄. As control run 49 shows, this catalyst is capable of producing 2500 g polymer/g catalyst but the solubles are high because of no phosphite and no AlCl₃. When supported on MgCl₂, and with TPP added, the catalyst produced 2000 g polymer/g catalyst but solubles were still high as shown in control run 50.

All of the various types of TiCl₃ used, when supported on MgCl₂ and used in conjunction with AlCl₃ and TPP, give catalysts having about the same activity. This suggests that the starting TiCl₃ material is dispersed and loses its identity during preparation of the catalyst.

As evidenced by the results obtained, the mole ratio of Al/Ti does not appear to be a decisive factor in catalyst productivity and soluble polymer formation, at least if it is kept within the previously stated limits.

At all times it must be kept in mind that there are many variables which affect the results. Thus, the most significant comparisons are between a specific control run and a specific invention run where a single variable is being considered. However, the advantage for the invention is sufficiently great that in general the invention runs are superior to the control runs even when extraneous variables favor the control runs. This can best be seen by comparing the best control run, run 48 and the least impressive invention run, run 42. In invention run 42 even with a less preferred method of reducing the TiCl₄, solubles of only 5.8 were obtained. The best control run, run 48, gave a reasonably satisfactory productivity only as a result of using a higher amount of TEA and as can be seen solubles were high. Also, it is possible that some AlCl₃ remained in the catalyst which accounts for a higher than expected productivity.

While this invention has been described in detail for the purpose of illustration, it is not to be construed as limited thereby but is intended to cover all changes and modifications within the spirit and scope thereof.

I claim:

1. A catalyst which forms on mixing MgCl₂, TiCl₃, AlCl₃ and an organic phosphite to form a first component which first component is combined with a cocatalyst comprising an organoaluminum compound, said $MgCl_2$ being present in an amount within the range of 50 to 95 weight percent, said $TiCl_3$ being present in an amount within the range of 2 to 20 weight percent, said $AlCl_3$ being present in an amount of 0.1 to 10 weight percent and said organic phosphite being present in an amount of 1 to 20 weight percent, based on the total weight of said first component.

2. A catalyst according to claim 1 wherein said cocatalyst is formed by contacting a trialkyl aluminum compound, a dihydrocarbylaluminum chloride, and a para-substituted benzoic acid alkyl ester.

3. A catalyst according to claim 2 wherein said cocatalyst is formed by contacting triethylaluminum, diethylaluminum chloride, and ethyl anisate.

4. A composition according to claim 3 wherein said phosphite is triphenyl phosphite.

5. A composition according to claim 4 wherein a mole ratio of said triethylaluminum-diethylaluminum chloride:ethyl anisate is within the range of 2–7:2–5:1.

6. A catalyst according to claim 5 wherein said $TiCl_3$ and $AlCl_3$ are $TiCl_3 \cdot 1/3 AlCl_3$ formed by reduction of $TiCl_4$ with aluminum.

7. A catalyst according to claim 6 formed by ball milling said $MgCl_2$, $TiCl_3$, $AlCl_3$, and phosphite to form said first component.

8. A catalyst according to claim 1 wherein said cocatalyst comprises a trialkyl aluminum compound.

9. A catalyst according to claim 8 wherein said trialkyl aluminum compound is triethylaluminum.

10. A catalyst according to claim 1 wherein a mole ratio of said organoaluminum compound to said $TiCl_3$ and $AlCl_3$ is within the range of 50:1 to 400:1.

11. A catalyst according to claim 1 wherein said first component comprises 70 to 90 weight percent of said $MgCl_2$, 4 to 12 weight percent of said $TiCl_3$, 1 to 4 weight percent of said $AlCl_3$ and 5 to 15 weight percent of said phosphite.

12. A catalyst according to claim 1 wherein said first component is formed by milling under intensive conditions, said $MgCl_2$, $TiCl_3$, $AlCl_3$, and phosphite.

* * * * *